(12) United States Patent
Gail, Jr. et al.

(10) Patent No.: US 7,116,639 B1
(45) Date of Patent: Oct. 3, 2006

(54) SYSTEM AND METHOD FOR DETERMINING NETWORK DISCRETE UTILIZATION

(75) Inventors: Harry R. Gail, Jr., Ossining, NY (US); Fredrick K. P. Klassen, Coquitlam (CA); Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 09/746,179

(22) Filed: Dec. 21, 2000

(51) Int. Cl.
*H04L 12/26* (2006.01)

(52) U.S. Cl. .............. 370/252; 370/517; 709/224

(58) Field of Classification Search .......... 370/241, 370/252, 253, 231, 232, 234, 514, 517; 709/224
See application file for complete search history.

(56) References Cited

U.S. PATENT DOCUMENTS

| | | | |
|---|---|---|---|
| 5,025,457 A * | 6/1991 | Ahmed | 375/354 |
| 5,142,531 A * | 8/1992 | Kirby | 370/254 |
| 5,315,580 A | 5/1994 | Phaal | 370/13 |
| 5,381,404 A | 1/1995 | Sugano et al. | 370/13 |
| 5,450,394 A | 9/1995 | Gruber et al. | 370/17 |
| 5,477,531 A | 12/1995 | McKee et al. | 370/17 |
| 5,563,875 A | 10/1996 | Hefel et al. | 370/15 |
| 5,570,346 A | 10/1996 | Shur | 370/17 |
| 5,596,719 A | 1/1997 | Ramakrishnan et al. | 395/200.02 |
| 5,627,766 A | 5/1997 | Beaven | 364/551.01 |
| 5,633,861 A | 5/1997 | Hanson et al. | 370/232 |
| 5,668,800 A | 9/1997 | Stevenson | 370/248 |
| 5,734,825 A | 3/1998 | Lauck | 395/200.13 |
| 5,768,520 A | 6/1998 | Dan et al. | 395/200.53 |
| 5,781,534 A | 7/1998 | Perlman et al. | 370/248 |
| 5,793,976 A | 8/1998 | Chen et al. | 395/200.54 |
| 6,026,095 A * | 2/2000 | Sherer et al. | 370/448 |
| 6,219,704 B1 * | 4/2001 | Kim et al. | 709/224 |
| 6,366,959 B1 * | 4/2002 | Sidhu et al. | 709/231 |
| 6,515,964 B1 * | 2/2003 | Cheung et al. | 370/230 |
| 6,597,907 B1 * | 7/2003 | Pruitt et al. | 455/423 |
| 6,678,244 B1 * | 1/2004 | Appanna et al. | 370/229 |
| 6,885,641 B1 * | 4/2005 | Chan et al. | 370/252 |
| 2002/0080726 A1 * | 6/2002 | Klassen et al. | 370/252 |
| 2005/0018611 A1 * | 1/2005 | Chan et al. | 370/241 |

* cited by examiner

*Primary Examiner*—Chau Nguyen
*Assistant Examiner*—Joshua Kading
(74) *Attorney, Agent, or Firm*—Randall J. Bluestone; Shelly M Beckstrand

(57) ABSTRACT

To evaluate a communications network, a plurality of network evaluation signals, or probative test packets, are selectively sent and received through the network. Responsive to these evaluation signals, network evaluation parameters are determined and stored. Queuing theory analysis, responsive to these parameters, determines the response time and throughput characteristics, including discrete capacity, utilization and performance, of the network. Calculation of the value of the network's discrete utilization involves the measurement of the network's average delay waiting for service, measurement of the network's standard deviation of delay waiting for service, calculation of discrete utilization from the ratio of these observed values, and then refinement of that calculation by proportionate factoring in instances of dropped samples as cases of one hundred percent utilization to arrive at a final figure for percent of network discrete utilization.

24 Claims, 9 Drawing Sheets

| ROW | A<br>PING DELTAS | B<br>SAMPLE |
|---|---|---|
| 6 | 0 | 1 |
| 7 | 0.00092 | 2 |
| 8 | 0.00097 | 3 |
| 9 | 0.00191 | 4 |
| 10 | 0.00347 | 5 |
| 11 | 0.00452 | 6 |
| 12 | 0.00536 | 7 |
| 13 | 0.00632 | 8 |
| 14 | 0.00729 | 9 |
| 15 | 0.01133 | 10 |
| 16 | 0.00421 | Tw |
| 17 | 0.00333 | σTw |

| J | |
|---|---|
| 383000 | OBSERVED LINE SPEED |
| 61476 | OBSERVED DISCRETE SPEED |
| 3.1150368 | HOP COUNT (TWO WAY) |
| 0.0013513 | OBSERVED Tw FOR HOP COUNT |
| 0.0033311 | OBSERVED σTw |

| | A | B | C | D | E | F | G | |
|---|---|---|---|---|---|---|---|---|
| 25 | 0.33 | 0.34 | 0.35 | 0.36 | 0.37 | 0.38 | 0.39 | MAXU |
| 26 | 0.985 | 1.030 | 1.077 | 1.125 | 1.175 | 1.226 | 1.279 | MAXM |
| 27 | 0.316 | 0.331 | 0.346 | 0.361 | 0.377 | 0.394 | 0.410 | MINM |
| 28 | 0.24 | 0.25 | 0.26 | 0.27 | 0.27 | 0.28 | 0.29 | MINU |
| 29 | 0.369 | 0.377 | 0.384 | 0.391 | 0.398 | 0.405 | 0.413 | RATIO 1 |
| 30 | 0.406 | 0.406 | 0.406 | 0.406 | 0.406 | 0.406 | 0.406 | RATIO 2 |

| 32 | 0.33 | DISCRETE UTILIZATION (AVERAGE) |
|---|---|---|
| 33 | 0.0013513 | Tw |
| 34 | 0.495 | MESSAGES ON QUEUE |
| 35 | 383000 | SPEED THIS HOP |
| 36 | 1045 | NETWORK AVERAGE MESSAGE SIZE |

FIG. 7

SYSTEM AND METHOD FOR DETERMINING NETWORK DISCRETE UTILIZATION

CROSS REFERENCES TO RELATED APPLICATIONS

U.S. patent application Ser. No. 09/746,183, entitled "SYSTEM AND METHOD FOR DETERMINING NETWORK THROUGHPUT SPEED AND STREAMING UTILIZATION", is assigned to the same assignee hereof and contains subject matter related to the subject matter of the present application. The above identified patent application is incorporated herein by reference.

This application is an improvement upon copending U.S. patent application Ser. No. 09/267,843, filed 12 Mar. 1999, by F. K. P. Klassen and R. M. Silverman, entitled "SYSTEM AND METHOD FOR ANALYZING AND TUNING A COMMUNICATIONS NETWORK", and Ser. No. 09/452,403 filed 1 Dec. 1999 by K. Chan, F. K. P. Klassen, and R. M. Silverman for "System and Method for Monitoring Performance, Analyzing Capacity and Utilization, and Planning Capacity for Networks and Intelligent, Network Connected Processes".

BACKGROUND OF THE INVENTION

1. Technical Field of the Invention

This invention relates to testing and analyzing a communications network. More particularly, the invention relates determining network discrete utilization.

2. Background Art

Users and managers of communications networks are interested in the capacity, performance, reliability, availability, topology, service level attainment, and modeling of their networks. Currently, many separate, incompatible, complicated, and often unsatisfactory tools are required to perform the tasks required by network managers.

One prior art technique provides for communication system analysis in which sequences of pings of different sizes are sent, transmitted in isolation from each other, in order to determine characteristics of the network beyond availability of resources and "usual" response time. In accordance with this technique, the best and mean times for the sequences of pings of different lengths are measured, and then the following are geometrically derived via use of the test ping packet sizes and the reciprocal of the bandwidth slope:

the network path's bandwidth,
the network path's propagation delay, and
the network path's queuing time.

Further network testing involves sending bursts of pings to determine the loss rate of packets, from which the "internal packet size of the network" can then be determined. By this it is meant that the minimum device buffer size in the transmission path of the network can be discovered. The sending of bursts of pings of decreasing size is also described, the intent of which is to determine if smaller packets are prioritized over larger packets. In this way, the following is determined:

the network path's minimum buffer size (also referred to as "internal packet size"); and
the network's short frame prioritization capability.

It is recognized in the art that there will generally be a plurality of network hops between the test station and the remote station, each with its own bandwidth. In these circumstances, taking the reciprocal of the slope of the line representing bandwidth is equivalent to saying that:

$$(1/\text{Bandwidth}) = (1/b1 + 1/b2 + \ldots 1/bn)$$

where $b1, b2, \ldots bn$ are the bandwidths of all the hops in the path. This will produce a bandwidth close to accurate only if there is one hop in the path that is significantly slower than all the others. Where this is not the case, the estimate may be inaccurate because no account is taken of the fact that for a multi-hop path, the intermediate nodes will delay onward transmission of a packet until the whole packet has been received.

U.S. patent application Ser. No. 09/267,843 filed 12 Aug. 1999 by F. K. P. Klassen and R. M. Silverman for System and Method for Analyzing and Tuning a Communications Network (Klassen and Silverman), and Ser. No. 09/452,403 filed 1 Dec. 1999 by K. Chan, F. K. P. Klassen, and R. M. Silverman for System and Method for Monitoring Performance, Analyzing Capacity and Utilization, and Planning Capacity for Networks and Intelligent, Network Connected Processes (Chan, Klassen and Silverman) improved upon the then existing art by:

distinguishing between and calculating the values for the streaming and discrete speeds of the network; and
calculating the utilization of that connection.

The distinction between the discrete and streaming speeds of a network allows for two accurate measures of network speed across multiple hops, as opposed to the previously known one, potentially inaccurate measure.

The discrete speed reflects the network's maximum bandwidth for handling "conversational" type transaction traffic, such as query-response. The streaming speed reflects the network's maximum speed for "batch" type traffic, such as file transfers and print. The network's streaming speed can also be referred to as "network throughput bandwidth."

Thus, probative test packets are transmitted, received and time stamped, and then mathematically analyzed. The result is a system and method in which full network capacity analysis can be performed across networks of any size, including the Internet, and to do so with no need for network documentation or knowledge of network topology or knowledge of capacity of network components.

It is an object of the invention to provide an improved system and method for determining end to end network discrete utilization, as distinguished from network streaming utilization.

It is a further object of the invention to provide an improved system and method for tuning the network.

It is a further object of the invention to provide an improved system and method for estimating the network's current performance and its future performance under changed conditions ("what-if" scenarios).

SUMMARY OF THE INVENTION

In accordance with the invention, a system and method are provided for evaluating a communications network. A plurality of network evaluation signals, or probative test packets, are selectively sent and received through the network. Responsive to these evaluation signals, selective network evaluation parameters are determined and stored. Queueing theory analysis, responsive to these parameters, determines the response time and throughput characteristics, including discrete capacity, utilization and performance, of the network.

Other features and advantages of this invention will become apparent from the following detailed description of the presently preferred embodiment of the invention, taken in conjunction with the accompanying drawings.

BRIEF DESCRIPTION OF THE DRAWINGS

FIG. 7 illustrates a spread sheet implementation of a preferred embodiment of the invention.

BEST MODE FOR CARRYING OUT THE INVENTION

Figure 1:
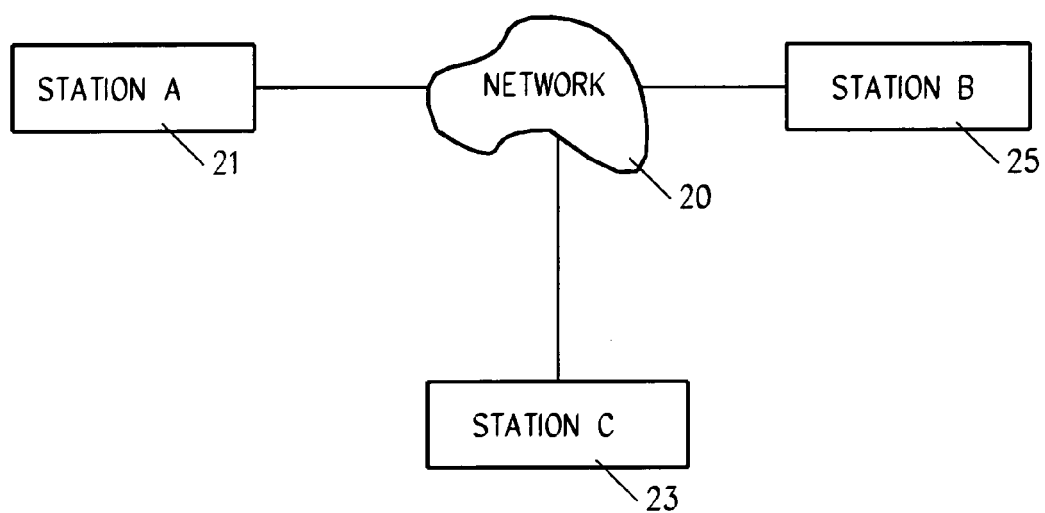
FIG. 1 illustrates a network with a test station attached in accordance with the preferred embodiment of the system of invention.

Referring to FIG. 1, a communications network cloud 20 is depicted with a client station 21, a server station 25 (or they can be peer stations) and a network management station 23 connected to the cloud at its boundary. The program code embodying a preferred embodiment of the invention can reside in any one or in any combination in each of the three stations 21–25. As used herein, a networked system refers to a network 20, intelligent end stations 21, 25, and the network 20 together with its intelligent end stations 21, 25 considered as a unitary whole.

Figure 2:
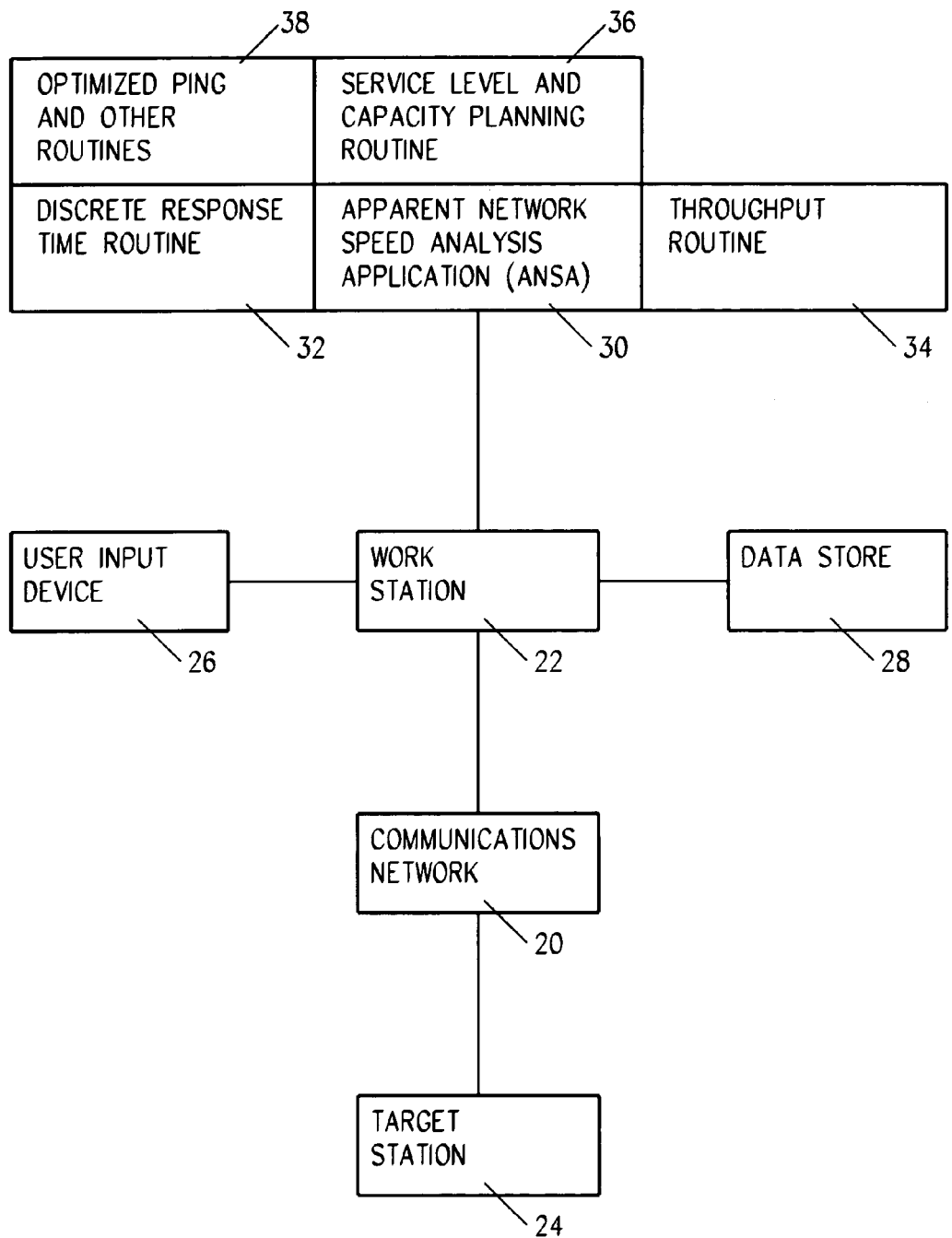
FIG. 2 illustrates a communications network and network evaluation system in accordance with a preferred embodiment of the system of the invention.

Referring to FIG. 2, in accordance with the preferred embodiment of the invention, apparent network speed analysis (ANSA) application 30 executes on workstation 22 to measure, monitor, estimate, capacity plan, and tune communications network 20 with respect to target station 24. A user input device 26 and data store 28 are provided at work station 22, and ANSA 30 includes a throughput routine 34, a service level and capacity planning routine 36, and optimized ping and other routines 38.

Network response time analysis routine 32 provides for determination of the apparent bandwidth, utilization, internal message size, queue factor, and device latency of communications network 20.

Throughput analysis routine 34 provides for defining, calculating, and using the following network concepts: Hop Count Factor, Duplex Factor, Throughput Factor, and Multi-Server Factor. Routine 34 relates to the receiving station, which as shown here may also be the sending station. As will be more fully described hereafter, in an exemplary embodiment, routines 38 first determine the MTU size of the network between send station 22 and target station 24, and then sends bursts of that packet size to target station 24. Target station 24 may echo or not. If it echos, throughput routine 34 would typically be provided at work station 22. However, routine 34 may also be provided at some station other than the station originating the packet bursts. If target station 24 does not echo, then it must time stamp the bursts and either do a throughput routine itself or provide them to some other station to perform the throughput analysis.

Routine 34 analyzes the time stamps to determine throughput speed of the network, which is the line speed, which is the inverse of slope of line (e,i) (FIG. 5) and is calculated as the total bits in a burst packet divided by the time from receipt of the first bit to the last bit. Routine 34 also includes a throughput utilization routine, deriving the throughput utilization as (1−(current available speed/maximum throughput speed)).

Service level and capacity planning routine 36, responsive to the skilled use of routines 32 and 34, provides comprehensive "what-if" network planning facilities; calculation of the increase (or change) in network traffic before network response time service level is compromised; calculation of the additional file load capacity of the network, which is the additional file load before response time is compromised (for both prioritized and non-prioritized network cases); and determination of tuning recommendations for recommended window size for file transfer to fill remaining capacity (both respective and irrespective of maintaining response time service level, and for both prioritized and non-prioritized cases). In addition, routine 36 performs comprehensive what if end processor planning for the end systems with respect to processor-bound, I/O-bound, and general transactions.

Optimized ping and other methodologies routines 38 provides for optimized pinging, and extensions for ping, transaction, file echoing, bursts, multi streaming, and uni-directional transmission and recording.

Figure 3:
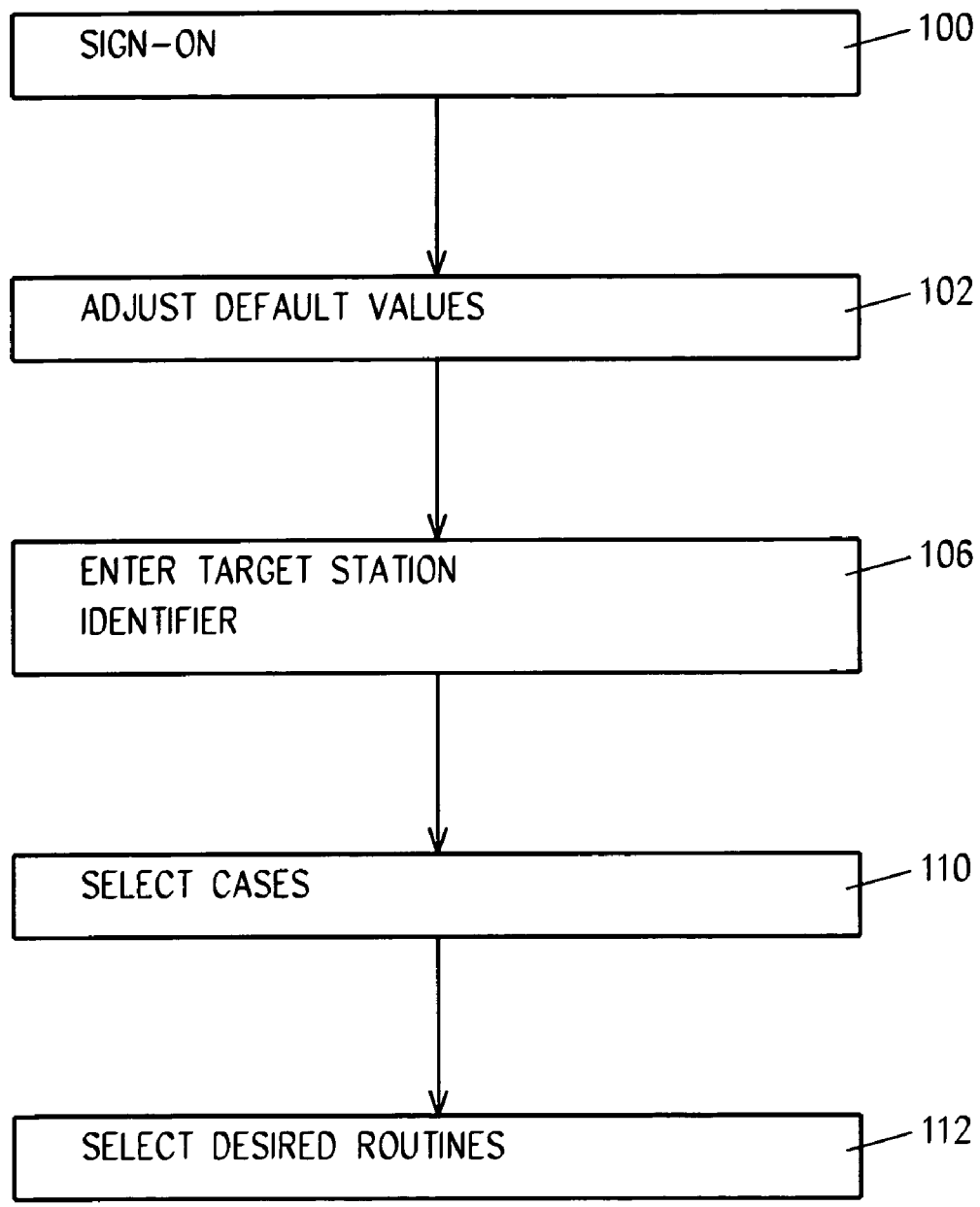
FIG. 3 illustrates a representative logic flow for user input.

Referring to FIG. 3, a flow chart is depicted in which program code or microprocessor-based microcode in a management function on a user, server, peer, management, or other device 21, 23, or 25 attaches to the network 20 and performs a sequence consisting of probative testing and analytical steps from which the capacity and utilization of the entire end-to-end system and its component end processor and network parts are stored, displayed, and retrieved, thereby reflecting the past and present condition of the networked system. Furthermore, with user input of proposed changed conditions, the future capacity, utilization, and performance of the networked system are calculated and reported or displayed.

Referring further to FIG. 3, in accordance with the preferred embodiment of the method of the invention, in step 100 the user signs on through input device 26 to the apparent network speed analysis application (ANSA) 30.

In step 102, the user adjusts default values, if desired. These default values include number of short or long pings and transactions, number of bytes per ping, and time between pings and transactions, as well as whether ANSA's network calculation is to be based upon a default value for average network message length, a user input value for average network message length, or a value that the system calculates.

In step 106, the user enters the IP address (or name) of the target station 24.

In step 108, the user enters the file transfer packet size (MTU).

In step 110, the user selects any or all of hop count, duplex, and streaming file transfer cases if throughput analysis is desired.

In step 112, the user selects a desired interactive (transaction response time-oriented) window recommendation routine and/or batch (file transfer) window estimation routine.

Figure 4:
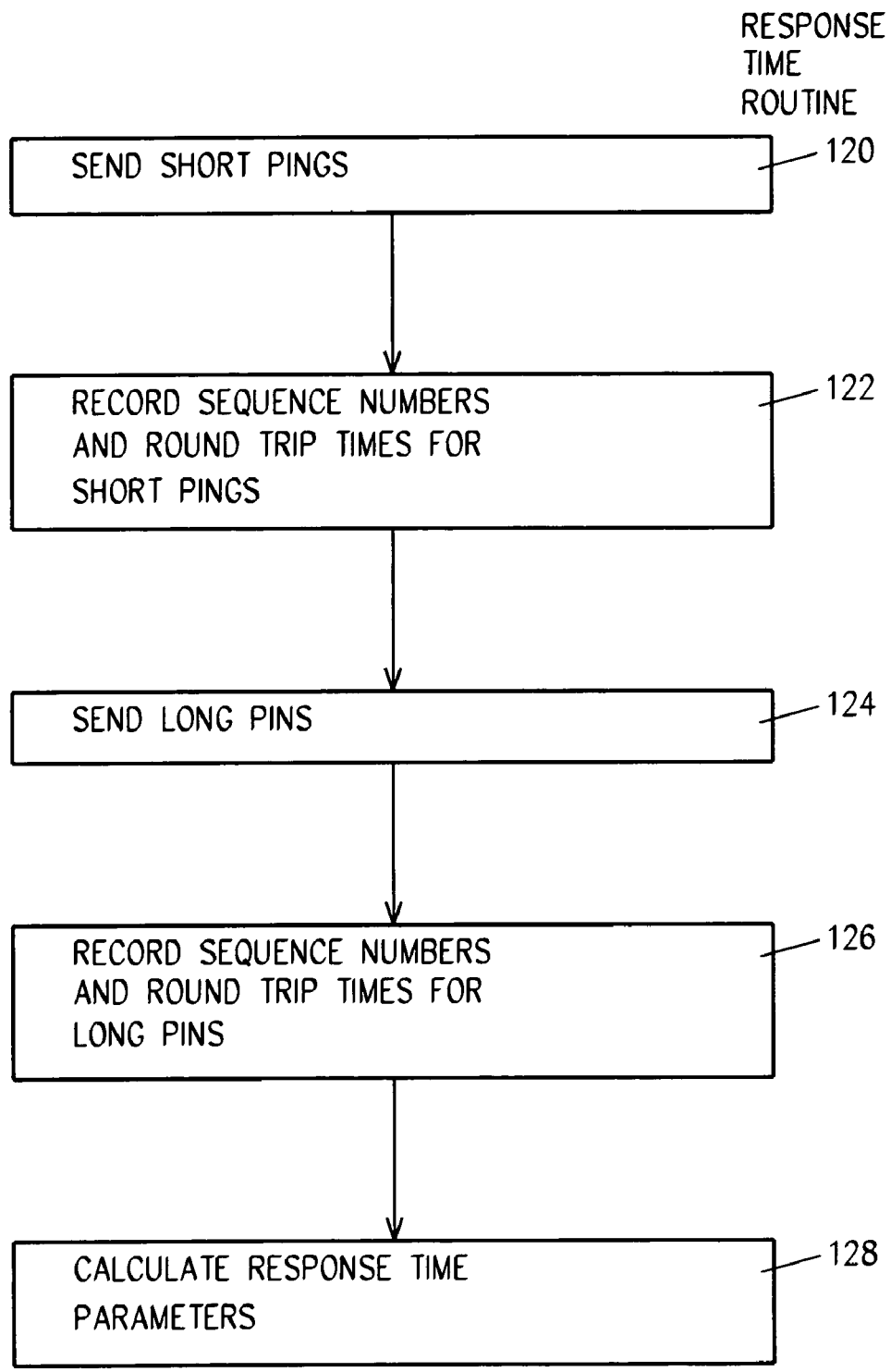
FIG. 4 illustrates a representative response time routine in accordance with the preferred embodiment of the invention.

Referring to FIG. 4, in accordance with a preferred embodiment of the invention, the apparent network speed analysis application (ANSA) 30 performs its response time routine 32.

In step 120, ANSA 30 sends to target station 24 over communications network 20, for example, 10 short pings of 64 bytes, 10 ms apart, unless modified in step 102 to new values.

In step 122, ANSA records the sequence numbers and round trip times for the short pings.

In step 124, ANSA sends, for example, 10 long pings of 1464 bytes, 10 ms apart, unless modified in step 102 to new values.

In step 126, ANSA records the sequence numbers and round trip times for the long pings.

In step 128, ANSA calculates, in a manner to be more fully described hereafter, response time parameters, including the following values, from the set of long and short pings: apparent bandwidth, current available bandwidth, current unavailable bandwidth, apparent utilization, apparent latency, average queue time, apparent queue depth, apparent queue factor, apparent average network message length, apparent maximum user window size, estimated current user window size, apparent jitter, estimated path propagation delay, apparent device latency, estimated optimal network service level, estimated current network service level, and estimated network utilization level at which service level compliance is compromised.

In the calculations described in Klassen & Silverman, ANSA 30 treated pings that timeout (no response received) effectively as 100% utilization events in the calculations and thus as having consumed the user specified ping timeout value. In the present invention, pings that timeout are proportionately considered to be indicators of events of over 90% utilization and thus provide the basis for determination of the network average message size and the network utilization, as will be more fully described hereafter.

Figure 5:
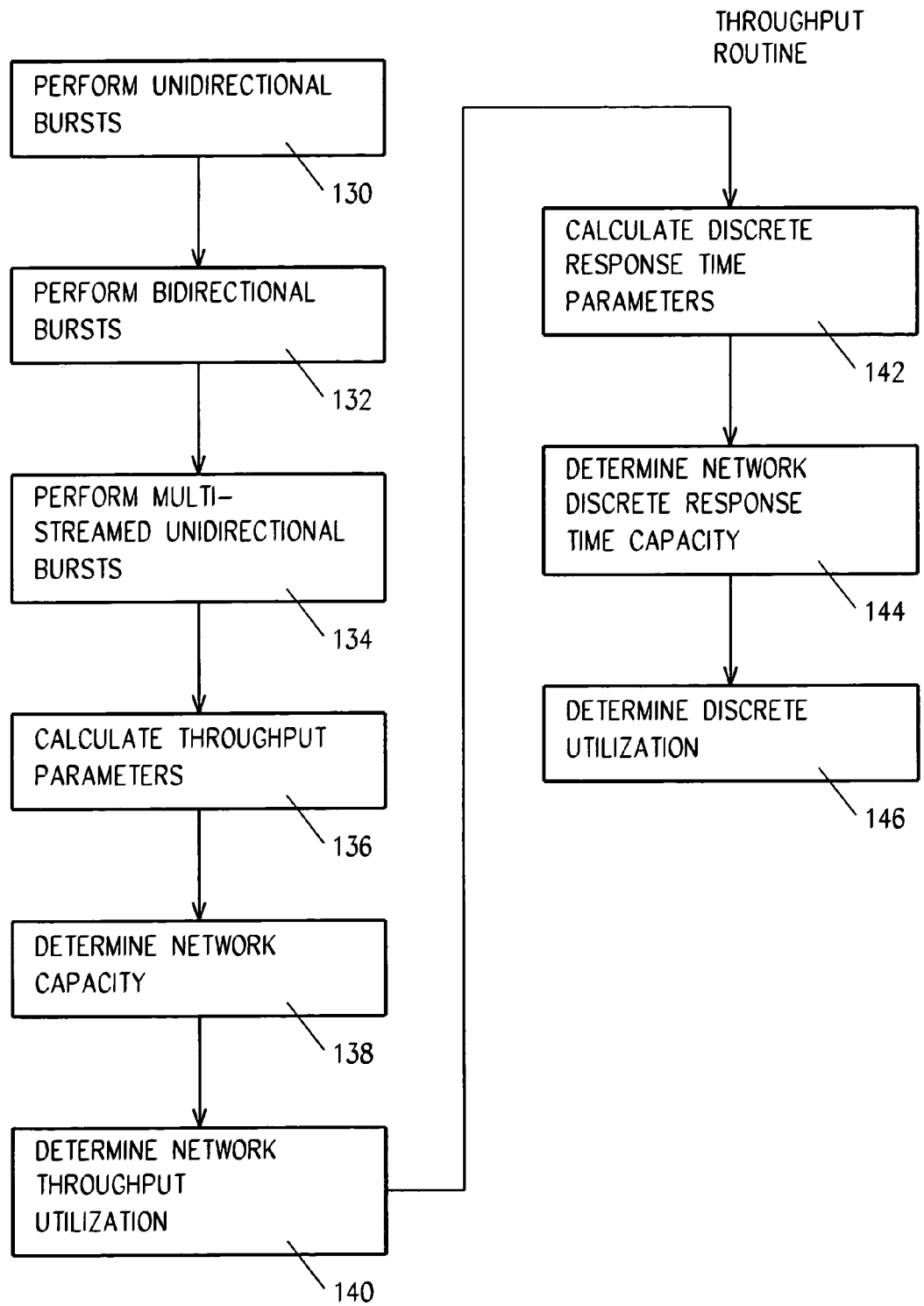
FIG. 5 illustrates the logic flow of the application and network throughput routine of the preferred embodiment of the invention.

Referring to FIG. 5, in accordance with a preferred embodiment of the invention, the apparent network speed analysis application (ANSA) 30 performs its throughput routine 34. Responsive to user selection of cases or functions in step 110, ANSA performs any or all of the functions in steps 130–146.

In step 130, ANSA 30 performs a unidirectional file transfer (FTP) or stream of unidirectional (non-echoed) bursts.

In step 132, ANSA 30 performs a bi-directional, concurrent file transfer or stream of echoed bursts.

In step 134, multi-streamed unidirection bursts are transmitted.

In step 136, all bursts are time stamped and dropped packets counted. Throughput parameters, to be more thoroughly described hereafter, are calculated.

In step 138, ANSA 30 determines network throughput capacity by calculating such throughput parameters as hop count, duplex, and total throughput factors, as will be described more fully hereafter.

In step 140, network throughput utilization is calculated, as will be more thoroughly described hereafter.

In step 142, discrete response time parameters are calculated, as will be more thoroughly described hereafter.

In step 144, network discrete response time capacity is calculated.

In step 146, discrete utilization is calculated for the network.

The system and method of the preferred embodiment of the invention combines a new network probing test frame transmission method with a new network analysis method that views an entire network as a singular entity and creates a queuing theory model for the network as a singular entity. In order to establish the historical, current, and predicted future of states of a network for all types of network traffic, including interactive, browser, batch, and realtime traffic, probative transmissions, including echoed and non-echoed packets, of like and differing lengths, of like and differing network priority, individually and in bursts or streams, are sent and transit times measured, and queuing theory applied to the results.

DISCRETE UTILIZATION

As is described more fully in the copending patent application Ser. No. 09/746,183, filed 21 Dec. 2000, when determining streaming utilization, a plurality of bursts of test packets (generally ten packets per burst) is transmitted and the results analyzed.

For determination of discrete utilization a plurality of transmissions of individual packets of different lengths (in an exemplary embodiment, without loss of generality, packets of two sizes, one "short" and one "long") are transmitted, each packet in isolation from the other and not in a burst. The network's discrete speed is calculated by considering the best end to end round trip time for long packets and short packets, as described in detail in Klassen and Silverman. The best time for the short packet is subtracted from the best time for the long packet and the number of short packet bits is subtracted from the number of long bits. The resulting ratio of bits divided by time determines the network's discrete speed.

The streaming speed, discrete speed, and streaming utilization of a network provide a basis for the calculation of its discrete utilization. In addition to these values, the average queue wait time for service "Tw", and the standard deviation of the average queue wait time for service "σTw" (i.e., sigma Tw) are used in the calculation of discrete utilization. These queue wait time values are calculated from the time stamped database records of the plurality of discrete test ping transmission samples by standard statistical analysis.

Referring to FIG. 7, a spreadsheet example for determining network discrete utilization and average message size is presented. In Table 1, the cell formulas for the spreadsheet of FIG. 7 are given.

Cells A6–A15 represent test samples from which average network queue wait time (cell A16, or Tw) and standard deviation of wait time (cell A17) are determined. There are ten samples of equal length pings, sorted by shortest first. Total times have been subtracted to derive the time delta of arrival, best to worst.

Cell J7 stores the observed line speed, or throughput speed (bytes per second).

Cell J8 stores the observed discrete speed (bytes per second).

Cell J9 stores the two-way hop count.

Cell J10 stores the observed σTw factored for hop count (in seconds).

Cell J11 stores the observed σTw not factored for hop count.

The table of cells A25–G30 is a section or view of a larger table used, in accordance with this exemplary embodiment, for determining discrete utilization. Cells in row 25 depict values from 33%–39% (represented as decimal equivalents) for utilization. Rows 27 and 28 show the message characteristics of this network and individual hop utilizations at those network utilizations. Rows 29 and 30 show ratios.

When rows 29 and 30 are equal in value (within some error value), the corresponding column represents the utilization parameters for this network.

Cell A32 calculates discrete utilization as the average of cells F28 and F25. Column F is selected for this calculation because of best match, or the equality, of cells F29 and F30.

Cell A33 copies the value in cell J10 for Tw.

Cell A34 is the messages on queue, derived from cell A32 according to the formula in Table 1.

Cell A35 is the hop speed copied from cell J7.

Cell A36 is the network average message size, calculated according to the formula in Table 1.

TABLE 1

SPREADSHEET EXAMPLE CELL FORMULAS

| CELL | FORMULA |
| --- | --- |
| A16: | @AVG(A6 . . . A15) |
| A17: | @STD(A6 . . . A15) |
| A26: | (A25/(1 − A25) ) *2 |
| A27: | +A26/J9 |
| A28: | +A27/(1 + A27) |
| A29: | +A28/(@SQRT(A28* (2 − A28) ) ) |
| A30: | +J10/J11 |
| A32: | (F28 + F25)/2 |
| A33: | +J10 |
| A34: | +A32/(1 − A32) |
| A35: | +J7 |
| A36: | @INT ( (A35/A32) * (A33 − (A33*A32) ) ) |
| . . . | (FOR CELLS B26 . . . G30, COPY FROM A26 . . . A30) |
| J9: | (J7/2)/J8 |
| J10: | +A16/J9 |
| J11: | +A17 |

Figure 6:
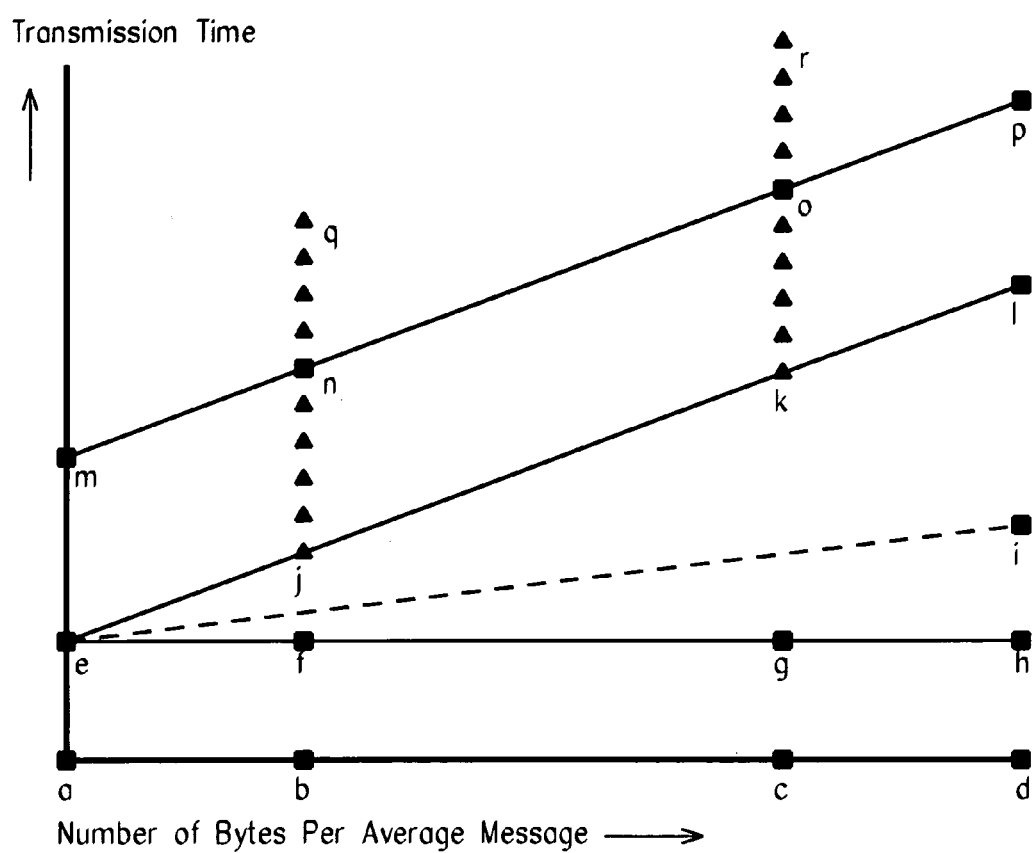
FIG. 6 geometrically illustrates ping and transaction results and bandwidth, utilization, and message size derivations in accordance with the preferred embodiment of the invention.

Referring to chart of FIG. 6 in connection with the spreadsheet of FIG. 7, the Y-axis is transmission time across the network, so points a,e, and m are successively increasing times. The X-axis is number of bytes per average network message, so points a, b, c, and d are successively increasing numbers of bytes that could be the numbers of bytes of an average message in the network.

a represents the origin point, which is zero bytes, zero time.

The data points represented by triangles j through q, and k through r represent the time it takes probative test sample packets to traverse the network. This could be a one way transmission or a two way (echo packet or ping) transmission.

b is the number of bytes in each of the j through q test samples.

c is the number of bytes in each of the samples k through r.

For samples j through q, n represents the average transmission time for that set of samples, j represents the best transmission time (no queuing was experienced by this sample), and q represents the time it takes for the worst surviving packet to be received.

For samples k through r, o represents the average transmission time for that set of samples, k represents the best transmission time (no queuing was experienced by this sample), and r represents the time it took for the worst surviving packet to be received.

In the spreadsheet of FIG. 7, cells A6 through A15 represent the subtraction of the time it takes the best ping (for example, ping j in FIG. 6) from each of the pings in the sequence. So for cell A6, the value is zero, because best ping minus best ping=0. Cell A15 represents the worst ping minus the best, which on the chart is q minus j.

Cell A16 represents the average of all of the time differentials in cells A6 through A15. This value is denoted as Tw, which is the average time spent waiting on queue in the network before receiving service. On the chart, Tw is the time span represented by segment (m,e). Segments (e,l) and (m,p) are parallel, because (m,p) remains a constant distance of (m,e) from (e,l).

Spreadsheet cell A17, the standard deviation of the ping times, is known as σTw (i.e., "sigma Tw"), which is not depicted in the chart of FIG. 6. What it mathematically represents is measure of the degree of variation (standard deviation) of the ping times.

Chart time (e,a) represents the latency of the network. Latency is not a factor in the calculation of utilization, and is not reflected in the spreadsheet. An approach for the calculation of latency is described in Klassen and Silverman, and is summarized hereafter.

Certain delays in transmission and receipt across the network occur that are invariant and also independent of the length of the packet being transmitted. The sum total across the network of such delays is the network's latency.

The physical length of the network is always a component of latency, for network length causes propagation delay which is identical for long and short frames. Device latency will be another component of latency if and only if the device through which packets are passing can handle longer and shorter frames in the same amount of time. Communication link serialization time is dependent on packet length and is, therefore, not considered a component of latency. And because latency here is construed to consist of the invariant delays inherent in the network, network queue delay, which is variable, is also not a component of latency.

The dashed line segment (e,i) represents the streaming speed of the network. Herein, this speed is calculated by transmitting a burst of (e.g., 10) packets across the network, calculating the time from the receiver's receipt of the first to the last, dividing the total number of bytes received by the time, and multiplying by 8 to get the bits per second throughput speed of the network. This value is cell J7 in the spreadsheet.

Line segment (e,l) represents the discrete speed of the network (also called "datagram speed"). As first described in Klassen and Silverman, this is computed by considering the number of bytes per small packet b from number of bytes per large packet c and multiplying by 8 to get bits. Then the time for transmission and receipt of j is subtracted from the time for transmission and receipt of k to get time. Bits are divided by time to get bits per second discrete speed of the network. Discrete speed is cell J8 in the spreadsheet.

Network discrete speed is less than network throughput speed in a multihop network, and equal in a single hop network. In this chart, speed is inversely proportional to line slope, so discrete speed will always have equal or greater slope than throughput speed.

Hop count, spreadsheet cell J9, represents the minimum possible number of actual physical hops in the end to end network. The hop count value is derived by dividing the throughput speed by the discrete speed. This value is then multiplied by two if the throughput speed was calculated with echo packets and the network is full duplex, which is represented in the spreadsheet example. Geometrically, this calculation would be represented in the chart of FIG. 6 by dividing the inverse of the slope of (e,i) by the inverse of the slope of (e,l) and multiplying the result by two.

The testing method for determining discrete line speed and discrete utilization involves transmission, receipt, and time stamping of test samples of (at least) two sizes. The geometric chart depicts samples of two sizes, namely smaller sample packets of b bytes length, and longer packets of c bytes length.

Line segment (f,j) represents the service time, Ts, for a packet of b bytes in this network. Line segment (j,n) represents the time waiting for service, Tw, for a packet of b bytes in the network. Line segment (f,n) represents the service time plus the average time, known as total queue time or Tq, for a packet of b bytes in the network. Tq=Ts+Tw.

Similarly, line segment (g,k) represents the service time Ts for a packet of c bytes in this network. Line segment (k,o) represents the time waiting for service, Tw, for a packet of c bytes in the network. Line segment (g,o) represents Tq, the service time plus the average time waiting for service, for a packet of c bytes.

The total service time plus the average wait time for a packet is commonly called "total queue time," and is denoted as Tq. In the chart of FIG. 6, the Tq value is represented by the perpendicular raised from segment (e,h) to segment (m,p).

Network latency, segment (e,a), is determined from samples j through q and samples k through r as follows. Samples j and k determine the slope of segment (e,l), whose inverse represents the network's discrete speed. Segment (b,j) represents the total response time for transmission and receipt of a packet of b bytes that experiences no network queuing. Therefore (b bytes*8)/network discrete speed=Ts for b bytes, which is segment (f,j) on the chart. Subtracting Ts from total response time gives latency; that is, (b,j)−(f,j)=(b,f). In this example latency is calculated from discrete speed and short packet response time. Discrete speed and large packet response time could similarly be used to calculate latency, as could averaged large and small packet response time and size together with discrete speed.

So far, samples j . . . q and k . . . r have been used to determine the network's latency, discrete speed, and average wait time. The network's actual average message size and discrete utilization have not yet been calculated. These as yet missing values are critical for purposes of capacity planning and problem determination.

The importance of determining average network message size can be seen as follows. If it happened to be the case that network average message size were b bytes, then absent the constant time for latency, the average network would spend the relatively large time of (j,n) waiting on queue for service, and the relatively small time of (f,j) actually receiving service. When wait time is high in proportion to service time, discrete utilization is high. On the other hand, if the average message size in this network happened to be c bytes in length, then the average wait time (k,o) would be low in proportion to average service time (g,k), meaning that discrete utilization is relatively low. It therefore remains to be shown how to determine the network's discrete utilization and average message size from samples j . . . q and k . . . r.

Without loss of generality, samples j . . . q are used to show the derivation of discrete utilization. Samples k . . . r or j . . . q and k . . . r averaged could also be used for this purpose. As shown above, (j,n) is the average wait time for service, Tw, in the network. Using standard statistics, the standard deviation of the response time of samples j . . . q is easily calculated. Since each sample in j . . . q has the same value for service time and latency, which is (b,j), the standard deviation of their total response time is equal to the standard deviation of their wait times, denoted as σTw. Note that if sampling is performed properly, both Tw and σTw will be equal or very close to equal for samples j . . . q and samples k . . . r. Also note that discrete utilization is denoted as p.

By queuing theory, Tw and σTw have the following values:

$$Tw = p*Ts/(1-p)$$

$$\sigma Tw = \text{square root } (p*(2-p))*Ts/(1-p).$$

Both Tw and σTw are easily observed and calculated from probative samples j . . . q. Dividing Tw by σTw thus gives a value that is equal to p/square root (p*(2−p)). Since a non-negative real number is equal to a function of a single variable (i.e., p) which is monotone increasing for non negative values, the solution is obtained uniquely algebraically or by using chart values for p=0 through 0.99, which are decimal representations of 0% through 99% utilization, to solve for p by approximation.

Once the value of p has been solved for or approximated, the queuing theory formula n=p/(1−p) is used in order to determine the average number of messages on queue, denoted by "n". Multiplying Tw by discrete line speed and dividing by 8 gives the total number of bytes on queue. Dividing total number of bytes on queue by n gives the average message size.

The average message size and utilization as calculated above solve for the maximum possible discrete utilization, namely the case in which the entire queue is at one hop in the network. It is also possible to solve for the minimum possible discrete utilization, and then provide an 'expert system' best guess of actual maximum hop utilization by a weighted blending of the max and min values. P represents the measure of the network's discrete utilization based on all detected queuing occurring at one hop. So P is the maximum discrete utilization. In FIG. 7, P values are shown at cells A25–G25. "U" is the measure of the network's discrete utilization based on the queue detected in the network being spread equally over each hop in the network's hop count. In FIG. 7, U values are shown at cells A28–G28.

Minimum possible utilization is computed as follows. The minimum number of hops in the network is computed by dividing the network's throughput speed by the network's discrete speed. Above, the total number of messages queued in the network was calculated. Here, that number is divided by the hop count, which yields the average number of messages queued per hop if messages are spread equally across each hop. Utilization may then be derived using the queuing theory formula u=n/(n+1), where u is (minimum) discrete utilization and n is the number of messages (per hop) awaiting and in service.

Figure 8A:
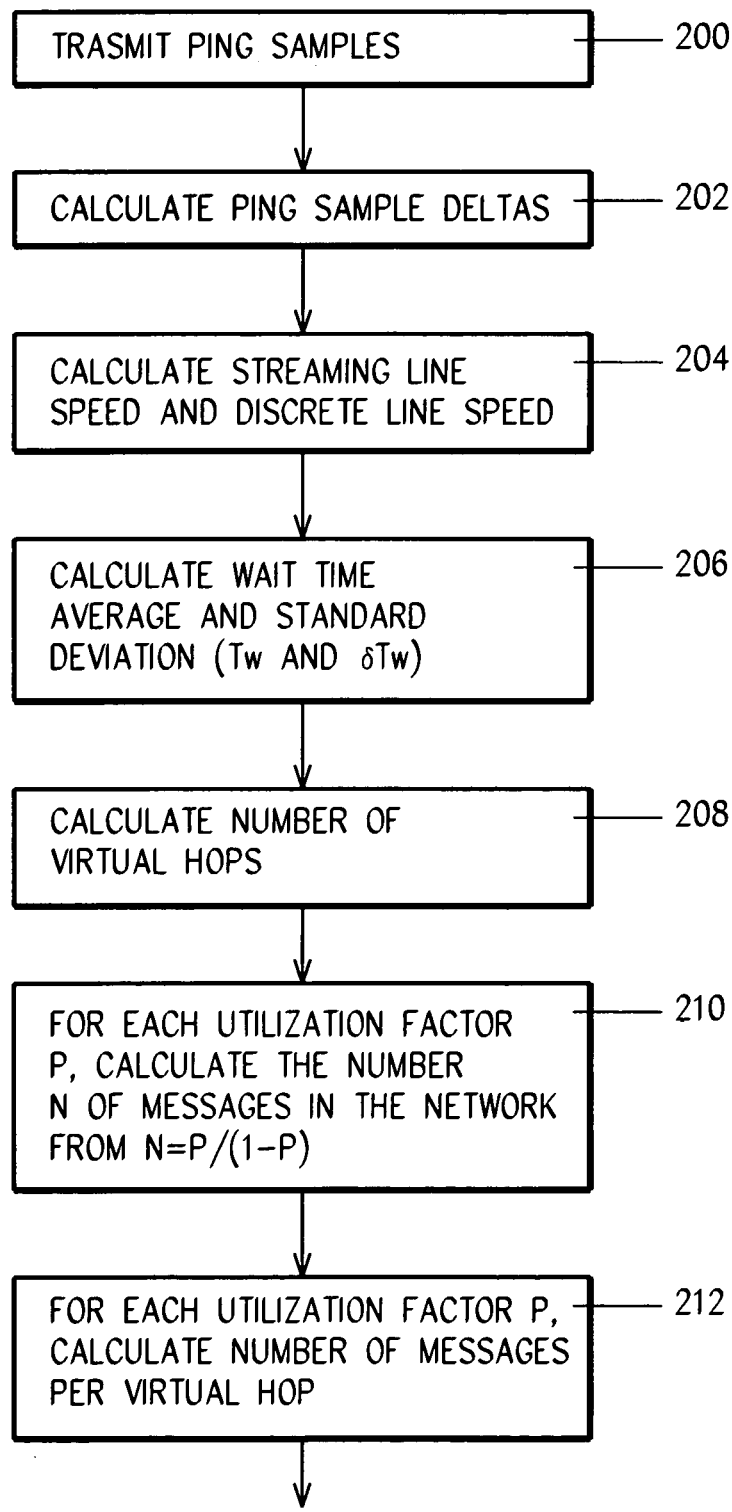
FIGS. 8A and 8B illustrate an exemplary embodiment of the method of the invention.
Figure 8B:
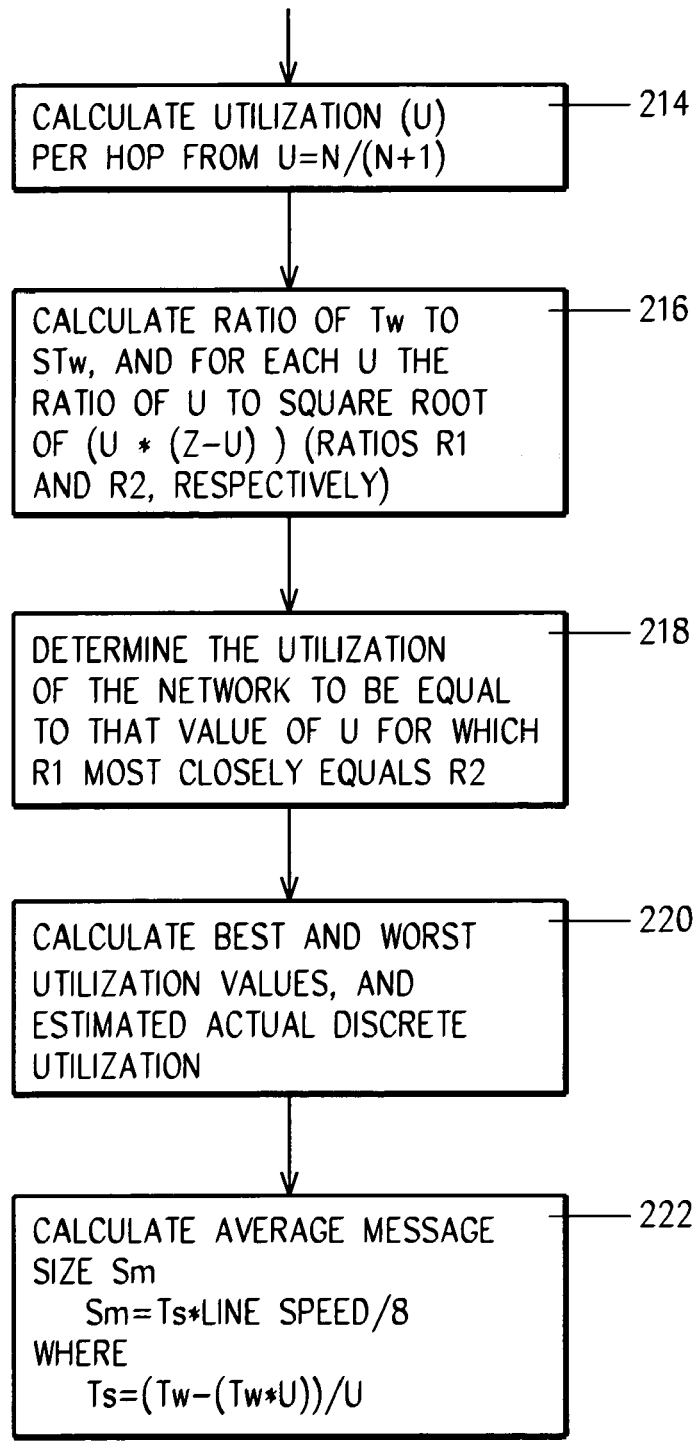

Referring to FIGS. 8A and 8B, in accordance with an exemplary embodiment of the method of the invention, discrete utilization is determined by matching the observed sigma Tw value with a chart-based or calculated sigma Tw in the following manner. This process is also illustrated in the spreadsheet in FIG. 7.

In step 200 several ping samples are transmitted through the network under test.

In step 202, ping sample time deltas are derived by subtracting the best ping time from each other ping time, and these may be ordered in a list.

In step 204, streaming line speed and discrete line speed are calculated, as described in copending patent application, Ser. No. 09/756,183, filed 21 Dec. 2000, and in Klassen and Silverman.

In step 206, average time network waiting for service (Tw) and standard deviation of wait time (σTw) are derived from the ping samples.

In step 208, the number of virtual hops in the network is calculated as the ratio of streaming speed to discrete speed.

In step 210, for each utilization factor P from 0 to 1 (or some subset thereof, in increments of, say 0.01), the number N of messages in the network is calculated from $N=P/(1-P)$.

The resulting values of N may be represented by a chart, as in the exemplary embodiment of the spreadsheet of FIG. 7, with decimal representations of utilization listed in a row in one percent increments. In FIG. 7, a section from such a chart, showing values of P from 33% through 39% (represented by the decimal equivalents, 0.33 through 0.39) is displayed at cells A25–G25. Such a chart with incremental values other than one percent could be used, without loss of generality. This utilization, denoted as P, represents possible values for the end to end network utilization.

In step 210, for each utilization value P, the number of messages N that would be in the network at that utilization is calculated, using the standard queuing theory formula, $N=P/(1-P)$.

In step 212, for each utilization value P, the number of messages per logical hop is calculated. This is the ratio of total messages to hop count, where hop count is calculated as the ratio of streaming speed to discrete speed.

In step 214, a utilization value U for a hop is calculated using $U=N/(N+1)$. (Thus, P represents end to end network utilization and U represents utilization of a hop.)

In step 216, the ratio of Tw to σTw is calculated, and for each U the ratio of U to square root of $(U*(2-U))$. The ratio of P to the square root of $(p*(2-p))$ and the ratio of Tw to σTw have been determined to be equivalent for a network, for both end to end utilization P and hop utilization U.

In step 218, by comparing (that is, determining the closest match of) the network's ratio of Tw to σTw derived in step 206 with all or representative ratios of U to the square root of $(U*(2-U))$ for all or representative possible values of U (from 0% to 99%) the value of U for the network is determined. The example of FIG. 7, this closest comparison occurs at cells F29 and F30.

In step 220, best, worst, and estimated actual discrete utilization values are derived. The internal hop characteristics of a network are determined by calculating the ratio of streaming speed to discrete speed. This ratio tells the minimum number of hops within the network. The utilization discovered in step 218 tells how many messages are queued in the network, but does not tell if the messages are evenly distributed throughout the network.

In this step 220, the minimum possible (best) utilization value (when messages are evenly spread throughout the network), the maximum (worst) possible utilization value (when messages are bunched at only one point in the network), and an expert system best guess of actual utilization, are derived. In the spreadsheet example of FIG. 7, actual utilization is calculated at cell A32 as an average of best (cell F25) and worst (cell F28). By calculating the best and worst possible values for end to end discrete network utilization P, the upper and lower bounds for possible values of actual P are discovered.

Methods other than taking the average of the MAXU value selected from row 25 and the MINU value selected from corresponding row 28 can be used as an expert system "best guess" for the value of P. For example, a weighted average in which a greater proportion is attributed to the upper or lower bound value may be used, or the network's streaming utilization used in determining the weighting. For example, the closer the streaming utilization is to zero, then the greater the proportion of weighting for the best guess estimate of discrete utilization P is assigned to the upper bound value for P than its lower bound.

In step 222, the average message size of the network is determined from $Ts=(Tw-(Tw*U))/U$. Since Tw and U have been determined, this gives the value for Ts, which is the average service time per message on a hop in the network. Average message size then equals Ts*linespeed/8.

The discrete utilization and the network's average message size derived in accordance with the preferred and exemplary embodiments of the invention, together with the method of using burst test sample packet transmissions for determining the network's streaming traffic rate, can be used in the "what if" calculations described in Klassen and Silverman and in Chan, Klassen and Silverman. These "what if" calculations, using these new values, will be enhanced distinguishing discrete and streaming utilization values determined in accordance with the present invention.

For example, in Klassen and Silverman, a method for calculating optimum network window size was provided. That method uses the network's streaming speed, discrete speed, latency, network average message size, file transfer application average message size, and utilization as required input data. In accordance with the present invention, the same basic formulas are used, but the calculations improved by (1) providing a more accurate calculation of network average message size; and (2) providing more accurate network utilizations by (a) substituting discrete utilization for the prior single network utilization value in predicting the performance of the windowing mechanism acknowledgment performance, and (b) substituting streaming utilization for a singular network utilization value in determining the streaming window requirements of an application.

Thus, the "what if" calculations of Klassen and Silverman are applicable to evaluating network performance in support of different end user applications. These end user applications are either streaming, conversational, or both streaming and conversational in nature. By distinguishing between and providing values for streaming and discrete utilization, utilization values more appropriate to end user application under examination may be used.

During the course of transmission and receipt of sample packets, there will be instances in which transmitted samples are not received by the receiver. Such frames may be permanently lost or they may be retransmitted. Whether lost or retransmitted, inherent network mechanisms, such as frame sequence numbering or network management functions enable measurement of the number of such frame losses. The method described above for utilization counts only successful transmissions in its measure of discrete utilization.

Where frame losses are encountered during the sampling period, it is necessary to account for these losses when computing discrete utilization. This is important because frame loss often occurs because heavy network utilization is causing storage buffers in the network to fill to the point that no additional incoming frames can be accepted, resulting in the discarding of frames.

In the system and method of a preferred embodiment of the invention, instances of frame discards are accounted for in the following manner. Each discarded frame is considered an instance of one hundred percent network utilization. The successful transmissions result in a measure of discrete utilization as described above, based on the observed ratio of average network delay to the standard deviation of average network delay. In order to account for dropped frames (which have "infinite delay," and therefore cannot be used in the calculation of the ratio), the dropped frames are accounted for not as instances of delays but as instances of 100 percent utilization that are averaged with the discrete utilization measure derived from successful transmissions.

For example, suppose a total of 100 sample frames are transmitted and that 5 sample frames are dropped. Suppose further that based upon the values of Tw and sigma Tw for the 95 successful transmissions, a network discrete utilization of 45% is determined. Since the 45% discrete utilization value does not take the discards into consideration, the 5 discards must also be considered. The following formula is used to derive the complete measure of discrete utilization (where all utilization measures are in decimal representation of percentage):

(percent successful transmissions*discrete utilization)+(percent drops*1.0)=complete measure of network utilization.

In the example, the calculation would be:

(0.95*0.45)+(0.05*1.0)=0.4215+0.05=0.4712=47.12% complete discrete utilization.

Thus, this method for calculation of the value of the network's discrete utilization involves the measurement of the network's average delay waiting for service, measurement of the network's standard deviation of delay waiting for service, calculation of discrete utilization from the ratio of these observed values, and then refinement of that calculation by proportionate factoring in instances of dropped samples as cases of one hundred percent utilization to arrive at a final figure for percent of network discrete utilization.

FORMULAS

In accordance with a specific embodiment of the invention, the explicit formulas calculated by ANSA are set forth hereafter. By deriving apparent bandwidth (response time capacity), network streaming utilization, network discrete utilization, and the network message size, all of queuing theory is now available for analytic and predictive purposes and can be applied, as described in Klassen and Silverman. Network streaming speed, Average Network Streaming Speed, Network Streaming Utilization, Network Discrete Speed, Network Queue Wait Time, Standard Deviation Network Queue Wait Time, Network Queue Wait Time, "Tw," from a queueing theory perspective, are more fully described in in copending application Ser. No. 09/746,183, filed 21 Dec. 2000.

Network Streaming Speed (the rate at which a network is capable of streaming a user's traffic, end to end, when otherwise vacant of traffic) - - -

Formula:

network streaming speed=total bits in burst/total receipt time for burst

Average Network Streaming Speed (the speed at which the network is capable of streaming a user's traffic under current conditions, including the traffic of other users of the network.) - - -

Formula:

average network streaming speed=total bits in burst/ average total receipt time for burst Network Streaming Utilization (the percent of the network currently in use that is not available to a user commencing use of an application that will stream traffic along the end to end network connection.) - - -

Formula:

network streaming utilization=(network streaming speed/average network streaming speed)*100.

As noted above, this includes overhead incurred for retransmissions.

Network Discrete Speed (this is the end to end rate at which datagram traffic will be carried across the network if the network is empty of other traffic and there is no retransmission required.)

Formula:

network discrete speed=(long packet bits−short packet bits)/(best long time−best short time)

Network Queue Wait Time, "Tw," as Derived from Testing (Tw is the actual average wait time experienced on queues before obtaining service between the ANSA test station and the target station) - - -

Formula:

Tw=S (ping sample $i$ time−best ping sample time) for all $i$/total number of ping samples.

Standard Deviation Network Queue Wait Time, σTw (the mean statistical variation of wait times on network queues prior to receiving service) - - -

Formula:
  The standard square of the square root of the differences between sample times, well known in statistical analysis.

Network Queue Wait Time, "Tw," from a Queueing Theory Perspective (the queueing theory formula for Tw):

Formula:

$Tw=pTs/(1-p)$ where Ts is the service time for an average network packet and p is the network's utilization.

Standard Deviation Network Queue Wait Time, σTw, from a Queueing Theory Perspective (the queueing theory formula for σTw):

Formula:

$\sigma Tw=[\ddot{O}(p*(2-p))]*(Ts/(1-p))$ where Ö denotes the square root operation.

In accordance with this embodiment of the invention, this formula is used in the following derivation of the value of a network's discrete utilization value. The importance of this queuing theory formula is that it relates the empirically derived value for σTw to utilization and service time values and, therefore, provides a necessary link between ANSAT testing methods and the derivation of discrete utilization and average network message length.

Ratio for Determination of Discrete Utilization (the key ratio used in solving for discrete utilization) - - -

Ratio
  Tw:σTw::p:Ö(p*(2−p))

Formula that Expresses Ratio:

$$Tw/\sigma Tw = p/\ddot{O}(p*(2-p))$$

Note:

The formula expresses a relationship between utilization (the "p" variable) the network's average wait time for service (the "Tw"). Since the Tw values are derived by empirical sampling, this ratio and its expression as a formula, provide the basis for the method and analytical technique for using ping or other one way or echo sampling to determine the network's end to end discrete utilization.

Derivation of Ratio and Formula:

$$Tw = p*Ts/(1-p)$$

$$\sigma Tw = [\ddot{O}(p*(2-p))]*(Ts/(1-p))$$

Dividing the top formula by the bottom, we get $Tw/\sigma Tw = p/[\ddot{O}(p*(2-p))]$.

Thus, utilization is expressed as a function of network delay.

Note:

(Ö denotes the square root operation)

Network Hop Count (network hop count is the minimum minimum number of network queues on the end to end path) - - -

Formula:

$$\text{network hop count} = \text{network streaming speed}/\text{network discrete speed}$$

Notes:

(1) This invention and its immediate predecessors consider the network to be a "black box" unitary entity, and not a network of queues. Prior to these, gathering information about the locations and characteristics of all system components and their workloads was required prior to construction of the network or system model which included network of queues analysis.

(2) In accordance with the present invention, test packets are sent across the network (or other system) and used to deduce the capacity of the network, its latency, and the current utilization of the capacity with no foreknowledge of the systems components or their workload.

(3) It is, therefore, important to note that the "network hop count" is not a count of actual network hops. Rather, mathematically, it is a measure of the minimum number of hops of network bottleneck hop speed that could be in the actual network, which is the lowest possible total number of hops. This number is used in determining the network's minimum possible network discrete utilization, which in turn is used in a preferred embodiment of the invention by an automated "expert system" in providing a best estimate of network discrete utilization for planning, capacity analysis, tuning, and service level analysis purposes.

Number of Messages on Queue at a Given Rate of Utilization (as utilization increases, the average number of items on queue awaiting service or in process increases) - - -

Formula:

$$\text{number of items in service or being served} = p/(1-p).$$

Notes:

(1) In formulas hereafter, this value is denoted as "p," and is the decimal representation of percent of overall network utilization.

Messages Queued per Logical Hop (at a given rate of network utilization, this is the measure of messages per internal hop if messages are spread equally among these logical hops) - - -

Formula:

$$\text{messages queued per logical hop} = \text{number of items in service or being serviced}/\text{hop count}.$$

Notes:

(1) Number of items in service or being served is from the prior formula, and is the measure of the total number of messages queued in the network.

(2) In formulas hereafter, this value is denoted as "u."

Utilization per Logical Hop (the utilization of a network internal hop if that hop has "n" messages on queue in service and awaiting service)

Formula:

$$\text{utilization per logical hop} = n/(n+1).$$

Note:

This represents the actual lower bound value for discrete utilization in the network.

Network Discrete Utilization (this is the expert system best guess approximation of end to end discrete utilization for the network) - - -

Formula:

$$\text{network discrete utilization} = (p+u)/2$$

Notes:

(1) This is calculated here as the equally weighted average of the lower and upper bound limits possible for discrete utilization as determined by test packet sampling of the network. Without loss of generality, one familiar with the art could employ consideration of other factors, such as the streaming utilization measure, which could be used in reasonably assigning more weight to p and less to u or more to u and less to p when performing the calculation for a particular network connection at a particular time. For example, generally, it would be reasonable to weigh p more heavily in the calculation of discrete utilization if the value for streaming utilization is low or zero.

(2) Discrete utilization as described by the formulas above is calculated based upon the ratio of Tw and sigma Tw. It is calculated as a minimum value "u" and a maximum value "p" and a weighted value of u and p averaged based upon consideration only of sample packets that have been transmitted and successfully received. To account for dropped frames requires an additional formula:

Network Discrete Utilization Including Dropped Sample Frames:

$$(\text{percent successful transmissions}*\text{discrete utilization}) + (\text{percent drops}*1.0) = \text{network utilization including dropped frames}$$

Current Network Discrete Speed (this is the network's discrete speed as slowed by discrete utilization)

Formula:

$$\text{current network discrete speed} = \text{network discrete speed}*(1-\text{network discrete utilization}).$$

Average Network Message Service Time, "Ts" (for discrete utilization "d," this is the hop time exclusive of any queueing for the average network message) - - -

Formula:

$$Ts = (Tw - (Tw*u))/u.$$

Average Message Size (for discrete utilization "d," this is the network's average message size)

Formula:

$$\text{average network message size} = Ts * \text{streaming linespeed}/8.$$

In the prior art, utilization has been construed to have a singular value. In accordance with the present invention, discrete utilization is distinguished from streaming utilization in multihop networks. The following new formula is both for measurement of utilization as a singular value in traditional queuing theory, which applies to single hop connections as well as a measure of discrete utilization in multihop networks:

sigma $Tw$ (i.e., the standard deviation of network queue wait time)=square root of (utilization*(2−utilization))*(average message service time/(1−utilization).    A.

Relating the above formula A to the standard, well known queueing theory formula:

$Tw$=utilization*average message service time/(1−utilization).    B.

These formulas A and B are placed in a ratio relationship. Dividing one of these formulas by the other (without loss of generality, formula B by the formula A) results in an equation in which the ratio of network wait time to the standard deviation of network wait time equals a formula with network (discrete) utilization as a single variable.

ADVANTAGES OVER THE PRIOR ART

It is an advantage of the invention that there is provided an improved system and method for determining end to end network discrete utilization, as distinguished from network streaming utilization.

It is an advantage of the invention that there is provided an improved system and method for tuning the network.

It is an advantage of the invention that there is provided an improved system and method for estimating the network's current performance and its future performance under changed conditions ("what-if" scenarios).

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for evaluating a network by deriving its discrete utilization and streaming utilization from observations of work performed on packets by a system including said network, comprising the steps of:

transmitting into said network a plurality of bursts of packets;

responsive to said bursts of packets, determining a streaming utilization of said network;

transmitting into said network a plurality of packets in isolation and of different lengths;

responsive to said plurality of packets, measuring average message delay through said network;

determining a standard deviation of said message delay; and calculating a discrete utilization of said network as a ratio of said average message delay to said standard deviation.

2. The method of claim 1, further comprising the steps of:

factoring instances of dropped messages as full utilization in calculating said discrete utilization.

3. Method for evaluating a network, comprising the steps of:

communicating of a plurality of long packets and short packets through said network;

determining a best time of said long packets;

determining a best time of said short packets;

responsive to a length of said long and short packets and their respective best times, determining Network Queue Wait Time (Tw) and a standard deviation of Network Queue Wait Time, (σTw);

responsive to said Tw and σTw, calculating a discrete utilization (p) of said network.

4. The method of claim 3, wherein said Tw, σTw and p are related by the expression:

$$Tw/\sigma Tw = p/\sqrt{(p*(2-p))}.$$

5. Method for evaluating a network, comprising the steps of:

sending test packets across said network;

based upon number of test packets transmitted, number of bytes per test packet, send and receive time stamps of each test packet, and number of test packets lost in transmission, deducing a capacity of said network, its latency, and a current utilization of said capacity;

calculating network hop count as a measure of a minimum number of hops of network bottleneck hop speed that could be in said network;

responsive to said network hop count, determining a minimum network discrete utilization;

responsive to said test packets, determining as a maximum network discrete utilization a number of messages queued per network hop count; and responsive to said minimum network discrete utilization and said maximum network discrete utilization, determining a best approximation of end to end discrete utilization.

6. The method of claim 5, further comprising the step of:

adjusting said end to end discrete utilization for dropped test packets.

7. The method of claim 5, said best approximation of end to end discrete utilization being an average of said minimum network discrete utilization and said maximum network discrete utilization.

8. The method of claim 5, further comprising the step of:
adjusting said best approximation of end to end discrete utilization by selectively weighting said minimum network discrete utilization or said maximum network discrete utilization responsive to network streaming utilization.

9. A method for evaluating network characteristics from observations of work performed on packets by a system including said network, comprising the steps of
determining a minimum network discrete utilization;
determining as a maximum network discrete utilization a number of messages queued per network hop count; and
responsive to said minimum network discrete utilization and said maximum network discrete utilization, determining a best approximation of end to end discrete utilization;
determining average message service time;
calculating a standard deviation of network queue wait time (σTw)=square root of (utilization*(2−utilization))*(average message service time/(1−utilization); and
determining network queue wait time (Tw)=utilization*average message service time/(1−utilization).

10. A method for evaluating a discrete utilization of a network, comprising the steps of
transmitting probative samples of at least two sizes through said network;
time stamping said probative samples;
responsive to said probative samples, calculating an average delay and a standard deviation of said average delay of said network;
responsive to said probative samples, determining a minimum network discrete utilization and a maximum network discrete utilization as respective functions of ratios of said average delay of said network to a standard deviation of said average delay; and
responsive to said minimum network discrete utilization and said maximum network discrete utilization, determining a best approximation of end to end discrete utilization.

11. The method of claim 10, said samples comprising one way echo packets.

12. The method of claim 10, said samples comprising two way echo packets.

13. The method of claim 10, further comprising the steps of:
fine tuning said discrete utilization by averaging dropped instances of said samples with successful transmissions of said samples to derive a measure of discrete utilization based upon a total set of said probative samples.

14. A program storage device readable by a machine, tangibly embodying a program of instructions executable by a machine for evaluating a network, comprising:
an apparent network speed analysis application module for measuring average message delay through said network, determining a standard deviation of said message delay, and calculating a discrete utilization of said network as a ratio of said average message delay to said standard deviation;
a service level and capacity planning routine module for tuning said network; said service level and capacity planning routine module for calculating change in network traffic before network response time service level is compromised, determining additional file load capacity of said network and adjusting window size for file transfer to fill remaining capacity.

15. A program storage device readable by a machine, tangibly embodying a program of instructions executable by a machine for evaluating a network from observations of work performed on packets by a system including said network, comprising:
a first program module for transmitting into said network a plurality of packets in isolation and of different lengths for measuring average message delay through said network;
a second program module for determining a standard deviation of said message delay; and
a third program module for calculating a discrete utilization of said network as a function of the ratio of said average message delay to said standard deviation.

16. A program storage device readable by a machine, tangibly embodying a program of instructions executable by a machine to perform method steps for evaluating a network from observations of work performed on packets by a system including said network, said method steps comprising:
transmitting into said network a plurality of packets in isolation and of different lengths;
measuring average message delay through said network;
determining a standard deviation of said message delay;
calculating a discrete utilization of said network as a function of the ratio of said average message delay to said standard deviation; and
determining a best approximation of end to end discrete utilization from minimum network discrete utilization and maximum network discrete utilization determined from said observations.

17. The program storage device of claim 16, said steps further comprising:
factoring instances of dropped messages as full utilization in calculating said discrete utilization.

18. A program storage device readable by a machine, tangibly embodying a program of instructions executable by a machine to perform method steps for evaluating a discrete utilization of a network from observations of work performed on probative samples by a system including said network, comprising:
transmitting probative samples through said network;
time stamping said probative samples;
responsive to said samples, calculating the average wait time and a standard deviation of average delay of said network;
deriving said discrete utilization as a function of a ratio of a wait time of said network to a standard deviation of the average wait time;
determining a minimum network discrete utilization;
determining as a maximum network discrete utilization a number of messages queued per network hop count;
responsive to said minimum network discrete utilization and said maximum network discrete utilization, determining a best approximation of end to end discrete utilization; and
fine tuning said discrete utilization by averaging dropped instances of said samples with successful transmissions of said samples to derive a measure of discrete utilization based upon a total set of said probative samples.

19. A program storage device readable by a machine, tangibly embodying a program of instructions executable by a machine to perform operations for evaluating a network, said operations comprising:

communicating of a plurality of long packets and short packets through said network;

determining a best time of said long packets;

determining a best time of said short packets;

responsive to said long and short packets and their respective best times, determining Network Queue Wait Time (Tw) and a standard deviation of Network Queue Wait Time, (σTw);

responsive to said Tw and σTw, calculating a discrete utilization (p) of said network.

20. The program storage device of claim 19 wherein said Tw, σTw and p are related by the expression:

$$Tw/\sigma Tw = p/\sqrt{(p*(2-p))}.$$

21. A program storage device readable by a machine, tangibly embodying a program of instructions executable by a machine to perform operations for evaluating a network, said operations comprising:

sending test packets across said network; based upon number of test packets transmitted, number of bytes per test packet, send and receive timestamps of each test packet, and number of test packets lost in transmission, deducing a capacity of said network, its latency, and a current utilization of said capacity;

calculating network hop count as a measure a minimum number of hops of network bottleneck hop speed that could be in the network;

responsive to said network hop count, determining the minimum network discrete utilization;

responsive to said test packets, determining as a maximum network discrete utilization a number of messages queued per network hop count; and responsive to said minimum network discrete utilization and said maximum network discrete utilization, determining a best approximation of end to end discrete utilization.

22. The program storage device of claim 21, said operations further comprising:

adjusting said end to end discrete utilization for dropped test packets.

23. The program storage device of claim 21, said best approximation of end to end discrete utilization being an average of said minimum network discrete utilization and said maximum network discrete utilization.

24. The program storage device of claim 21, said operations further comprising:

adjusting said best approximation of end to end discrete utilization by selectively weighting said minimum network discrete utilization or said maximum network discrete utilization responsive to network streaming utilization.

* * * * *